United States Patent
Holness et al.

(10) Patent No.: US 8,787,398 B2
(45) Date of Patent: Jul. 22, 2014

(54) LINEAR ROUTE PROTECTION

(75) Inventors: Marc Holness, Neapean (CA); Bashar Abdullah, Ottawa (CA); Marc-Andre Rochon, Gatineau (CA); Simon Parry, Manuden Bishops Stortford (GB); Chris Ramsden, Hertford (GB)

(73) Assignee: Ciena Corporation, Hanover, MD (US)

( * ) Notice: Subject to any disclaimer, the term of this patent is extended or adjusted under 35 U.S.C. 154(b) by 207 days.

(21) Appl. No.: 13/388,780

(22) PCT Filed: Jul. 31, 2009

(86) PCT No.: PCT/CA2009/001068
§ 371 (c)(1),
(2), (4) Date: Apr. 16, 2012

(87) PCT Pub. No.: WO2011/011853
PCT Pub. Date: Feb. 3, 2011

(65) Prior Publication Data
US 2012/0281710 A1    Nov. 8, 2012

(51) Int. Cl.
*H04L 12/28*    (2006.01)

(52) U.S. Cl.
USPC ........... 370/406; 370/351; 370/242; 370/231; 370/216

(58) Field of Classification Search
USPC ................ 370/225, 223, 400, 216, 406, 220; 709/238
See application file for complete search history.

(56) References Cited

U.S. PATENT DOCUMENTS

| | | | |
|---|---|---|---|
| 6,370,110 B1* | 4/2002 | Eslambolchi | 370/216 |
| 2008/0291925 A1* | 11/2008 | Fisher et al. | 370/400 |
| 2009/0310481 A1* | 12/2009 | Deng et al. | 370/223 |
| 2010/0226244 A1* | 9/2010 | Mizutani et al. | 370/220 |

OTHER PUBLICATIONS

Recommendation ITU-T G.8032/Y.1344 (Jun. 2008) Ethernet ring protection switching.

* cited by examiner

*Primary Examiner* — Raj Jain
*Assistant Examiner* — Jamaal Henson
(74) *Attorney, Agent, or Firm* — Clements Bernard PLLC; Christopher L. Bernard; Lawrence A. Baratta, Jr.

(57) ABSTRACT

A system for controlling packet forwarding through a point-to-point (p2p) connection between first and second end nodes of a packet network domain having a mesh topology. The system comprises a sub-ring network instantiated in the network domain, the sub-ring network comprising a pair of topologically diverse ring spans extending between the first and second end nodes. Each of the end nodes is controlled to forward packets of the p2p connection through the sub-ring network in accordance with a ring network routing scheme, and an intermediate node traversed by one of the ring spans is controlled to forward packets of the p2p connection through the ring span in accordance with a linear path routing scheme.

4 Claims, 5 Drawing Sheets

LINEAR ROUTE PROTECTION

FIELD OF THE INVENTION

The present invention relates to management of traffic forwarding in packet networks, and in particular to methods of protecting linear routes in a packet network.

BACKGROUND OF THE INVENTION

Ethernet is increasingly popular as a transport network for high speed Wide Area Network (WAN) communications. Various techniques have been developed to enable the deployment of Ethernet transport networks with a mesh topology. Among other things, these enable the provisioning of topologically diverse paths for traffic protection, while preventing the formation of loops within the network.

Spanning Tree Protocol (STP) is frequently used to compute traffic forwarding paths through a mesh network, in such a manner that loops are prevented. Typically, each node will compute a spanning tree rooted at itself, and which extends to every other peer node in its network domain. For example, FIG. 1a illustrates an example in which an edge node (SA) 2 has computed a spanning tree 4 rooted at itself, and extending to all other edge nodes 6 in its "home" network domain 8. Once the tree 4 has been computed, a point-to-point (p2p) connection between the root node (SA) and any given peer edge node 6 (such as destination node, DA, shown in FIG. 1a) can be implemented by computing a path 10 through the tree, and installing appropriate forwarding state in each of the network nodes traversed 12 by that path 10.

In effect, STP converts the mesh network topology into a tree topology, so that packets are forced to traverse the network from any source address (SA) to any destination address (DA) by following the tree 4 rooted at SA. If a network failure (such as a node or link failure) occurs, the tree 4 must be re-computed to re-establish connectivity. In order to prevent network instability and formation of loops during the tree recomputation, all traffic through the tree 4 is terminated until the new tree has been computed, and forwarding state implementing the new tree installed in each node. In large mesh networks, this can require several seconds.

Faster recovery times can be obtained by localizing failures to a particular branch. With this arrangement, the branch of the tree that is directly affected by the detected failure is "pruned", and a new branch recomputed, starting from the root of the pruned branch. This has an advantage in that only traffic to destination nodes lying "downstream" of the network failure is interrupted, while traffic is permitted to flow through the rest of the network tree. However, in this case, the failure recovery time is dependent on the location of the failure, and the topology of the tree, and so can be unpredictable.

Another approach is to compute two (or more) topologically diverse trees 4a, 4b rooted at SA, as shown in FIG. 1b. With this arrangement, each node is the "root" of a pair of trees, one of which can be designated as a working tree (shown in solid lines in FIG. 1b), and the other as a protection tree (shown in dashed lines in FIG. 1b). If a network failure affecting the working tree is detected, a failure indication message is propagated to the root node (SA), which can then "switch" traffic to the protection tree. In this case, the failure recovery time is principally dependent on the time required for the failure indication message to propagate to the root node, which can be relatively fast. However, this method requires the computation of a very large number of trees within the network, and it can be very difficult to guarantee topological diversity between the working and protection trees.

For Ethernet transport networks, it would be desirable to obtain failure recovery times comparable to those obtained in physical layer transport technologies such as Synchronous Optical Network/Synchronous Digital Hierarchy SONET/SDH, that is; 50 msec, or less. In theory, techniques based on the pre-computation of working and protection paths are capable of achieving this level of protection switching performance. However, this performance comes at a cost of great complexity. A simpler solution is desired.

ITU-T SG15/Q9 recommendation G.8032 (February, 2008) describes protection switching in an Ethernet ring. Referring to FIG. 2, an Ethernet ring 14 is an Ethernet network comprising nodes 16 and links 18 connected together in a ring topology. One of the links of the ring 14 is designated as a Ring Protection Link (RPL), and is disabled during normal operation of the ring by placing a channel block 20 on that link. Typically, a channel block 20 is imposed at a node at one end of the RPL. This node may then be referred to as the RPL Owner. In some cases, the channel block 20 may, for example, comprise a policy that prevents packets of the ring from being forwarded through a port hosting the RPL. With such a channel block in place, the ring 14 is guaranteed to be loop free, and conventional Ethernet MAC-learning and path computation can be used to compute forwarding state in each node 16 of the ring 14.

As described in ITU-T recommendation G.8032, a failure of either a link 18 or a node 16 of the ring 14 will be detected by the two nodes nearest the point of failure. Both of these nodes will install a channel block on the port facing the fault and will send a Failure Indication Message (FIM) to their adjacent nodes in the ring. These FIMs will be propagated, in opposite directions, around the ring. Upon receipt of the initial FIM, each node flushes its forwarding database (FDB), and forwards the FIM to the next node on the ring. In addition, the RPL-Owner will remove the channel block 20. This effectively enables connectivity within the ring to be re-established using conventional Ethernet flooding and MAC learning functionality. A convenient aspect of this approach is that the conventional Ethernet flooding behavior forwards traffic into the ring as the primary mechanism for MAC learning and path computation. As a result, traffic flow within the ring 14 is restored almost immediately after the FDB in each node 16 has been flushed, so that the failure recovery time of the ring 14 is dominated by the speed at with the FIMs propagate around the ring. Failure recovery times of 50 msec or less can readily be obtained in practical WANs. However, ITU/T recommendation G.8032 is based on a ring network topology. No comparable scheme is available for implementation in a mesh network.

BRIEF SUMMARY OF THE INVENTION

Thus, an aspect of the present invention provides a system for controlling packet forwarding through a point-to-point (p2p) connection between first and second end nodes of a packet network domain having a mesh topology. The system comprises a sub-ring network instantiated in the network domain, the sub-ring network comprising a pair of topologically diverse ring spans extending between the first and second end nodes. Each of the end nodes is controlled to forward packets of the p2p connection through the sub-ring network in accordance with a ring network routing scheme, and an intermediate node traversed by one of the ring spans is controlled to forward packets of the p2p connection through the ring span in accordance with a linear path routing scheme.

An advantage of the present invention is that a ring network routing scheme is used to control traffic forwarding through a logical point-to-point connection, which provides high-speed protection switching and guaranteed loop freeness.

BRIEF DESCRIPTION OF THE DRAWING(S)

Further features and advantages of the present invention will become apparent from the following detailed description, taken in combination with the appended drawings, in which:

FIGS. 1a and b is a schematic illustration of a network conventional spanning trees supporting point-to-point paths in a mesh network, known in the art;

Figure 1A:
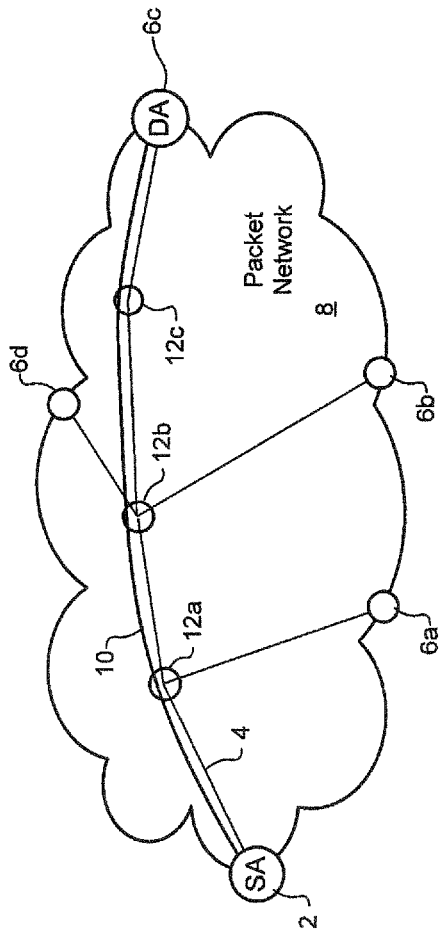
Figure 1B:
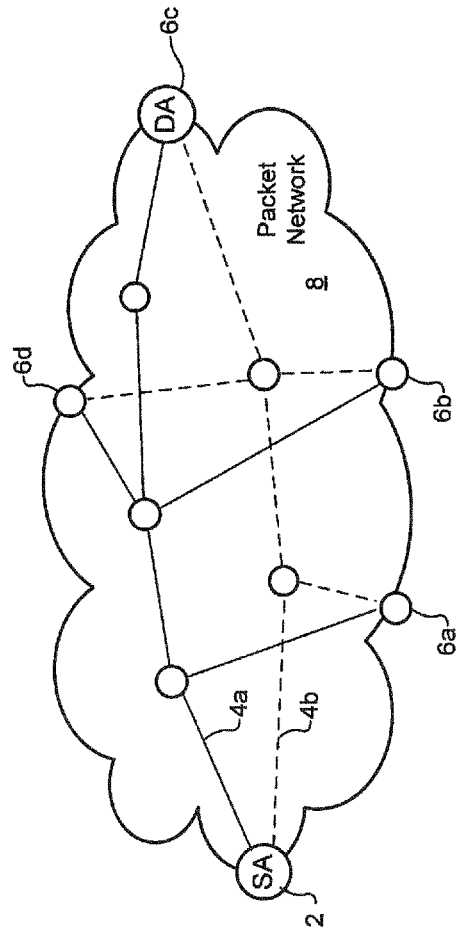
Figure 2:
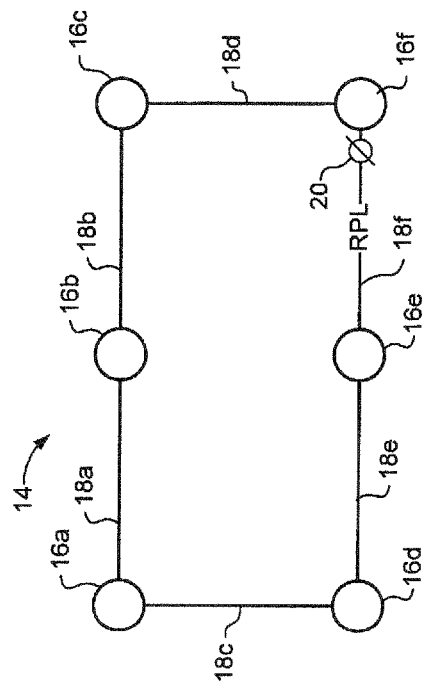
FIG. 2 is a schematic illustration of a network a network having a ring topology known, for example from ITU/T recommendation G.8032.
Figure 3:
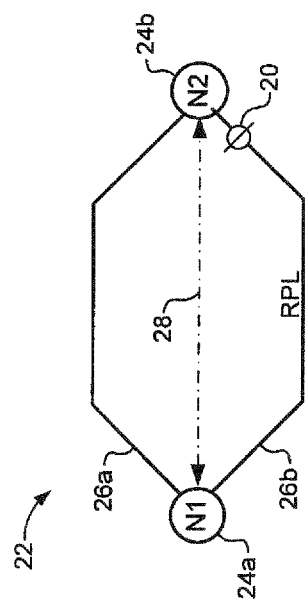
FIG. 3 is a schematic illustration of a representative sub-ring network in accordance with an embodiment of the present invention.
Figure 4A:
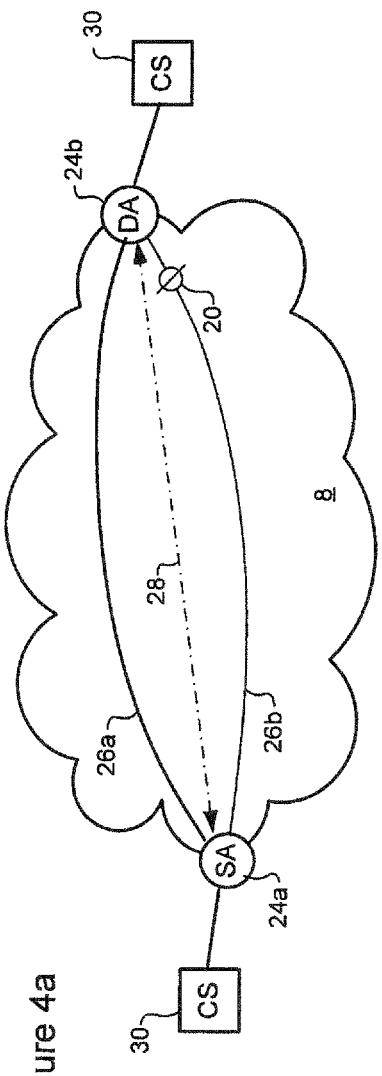
Figure 4B:
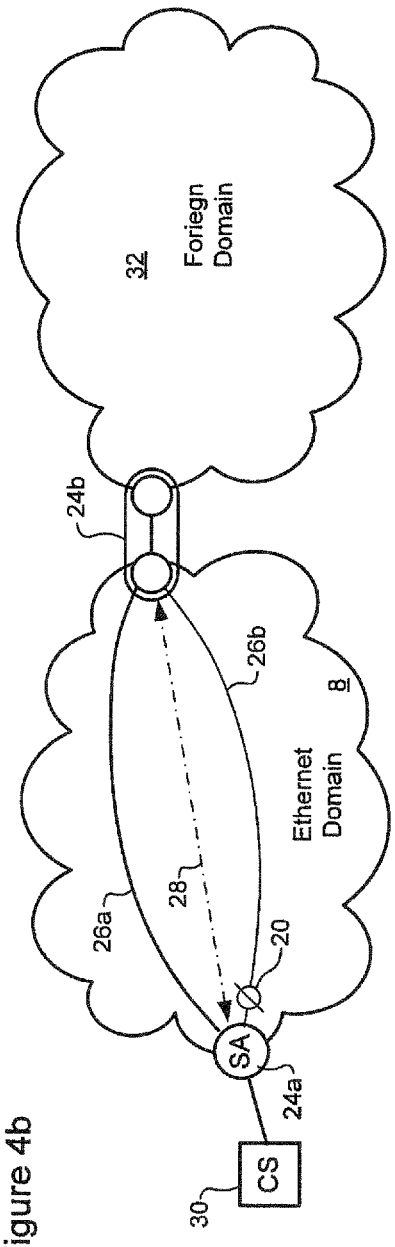
Figure 5A:
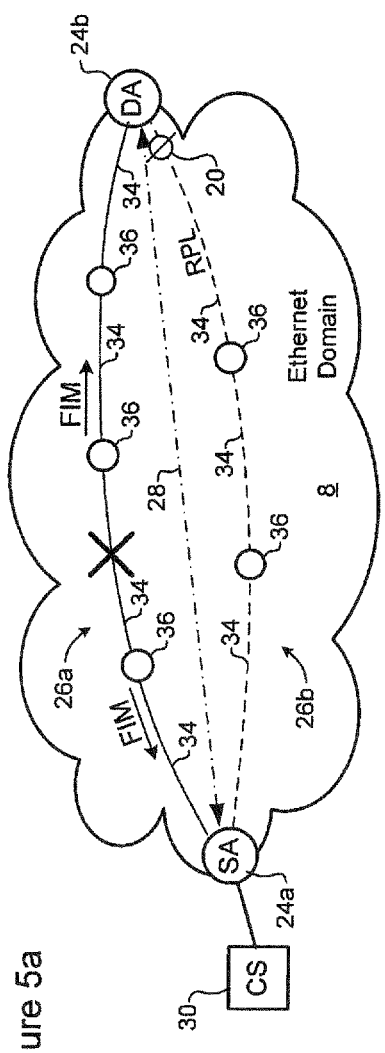
Figure 5B:
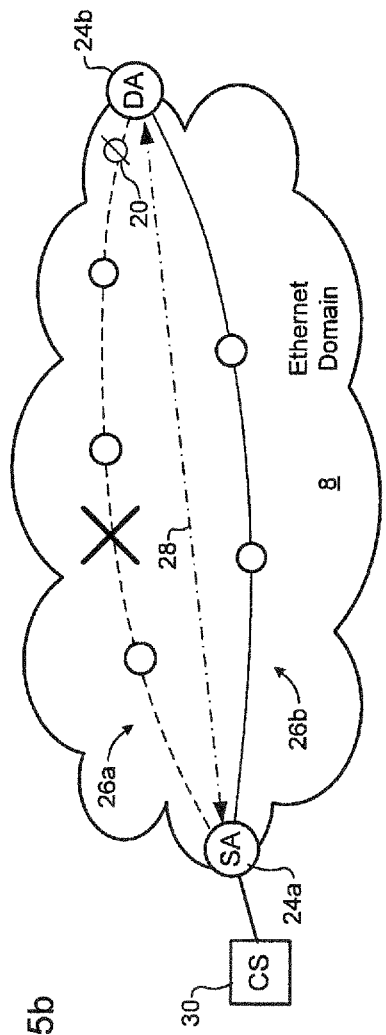
Figure 6:
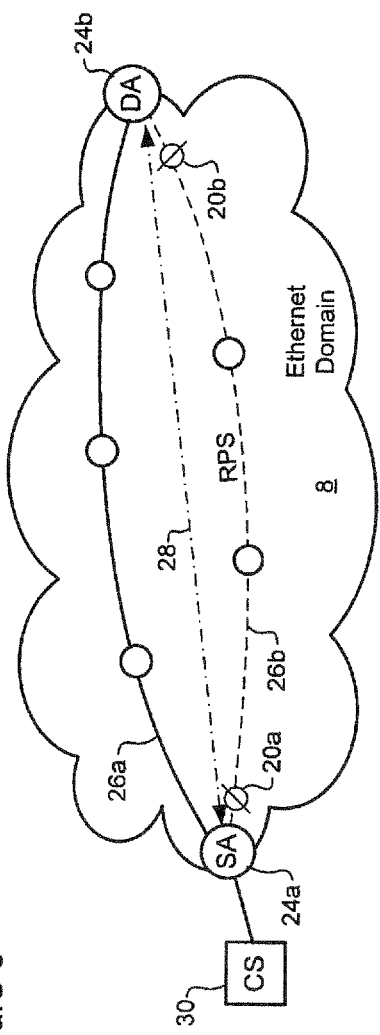
Figure 7:
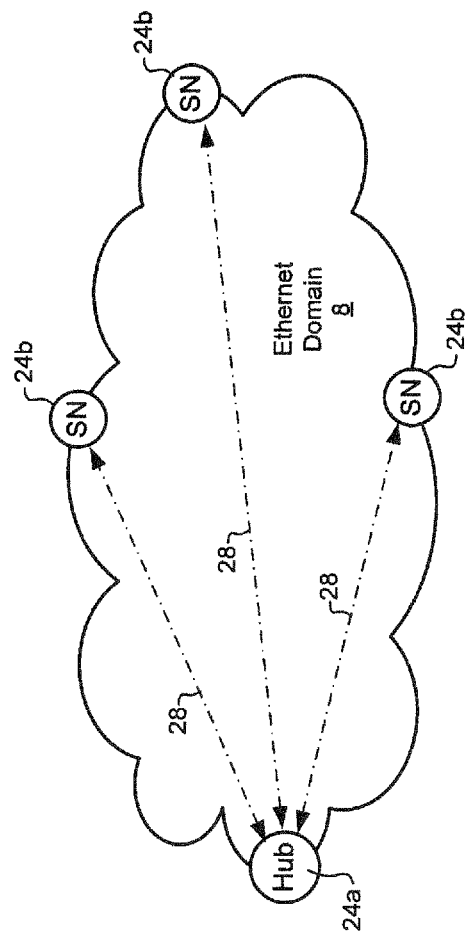

FIGS. 4a and 4b schematically illustrate use of the sub-ring network of FIG. 3 to support a logical point-to-point connection in a packet network, in respective difference scenarios;

FIGS. 5a and 5b schematically illustrate failure recovery in the embodiment of FIG. 4a;

FIG. 6 is a schematic illustration of a sub-ring network in accordance with a second embodiment of the present invention; and FIG. 7 is a schematic illustration of a hub-and-spoke partition implemented in a network domain using sub-ring networks in accordance with embodiments of the present invention.

It will be noted that throughout the appended drawings, like features are identified by like reference numerals.

DETAILED DESCRIPTION OF THE INVENTION

The present invention provides a method of supporting high speed protection switching of point-to-point (p2p) paths in a mesh network. Embodiments of the invention are described below, by way of example only, with reference to FIGS. 3-6.

The present invention provides a sub-ring network, and techniques for using the sub-ring to instantiate a logical point-to-point (p2p) connection between two nodes in a mesh network. The sub-ring network enables high speed protection switching (typically sub-50 msec) and guaranteed loop freeness.

Referring to FIG. 3, sub-ring network 22 is a packet network (or sub-network) which includes two end nodes (N1 and N2) 24a, 24b interconnected by a pair of topologically diverse ring spans 26a, 26b. Each of the end nodes 24 implements a ring-type traffic forwarding and protection switching scheme. If desired, the sub-ring network 22 can be implemented at a low level of the protocol stack (e.g. at layer 1 or 2) so that application layers have awareness only to the logical p2p connection 28 between the end-nodes.

Each ring span 26 may comprise a direct physical link between the end nodes 24, or may traverse one or more intermediate nodes, as may be desired or required to accommodate the physical topology of the network and maintain diversity between the two spans 26. Conventional point-to-point path computation techniques (such as, for example, a least-cost path computation using a Dijkstra algorithm) may be used to compute each ring span 26, subject to the constraint of topological diversity. Other methods of computing the path of each ring span 26 may be used, as desired.

Traffic is constrained to join and leave the sub-ring 22 at the end nodes 24. This means that any intermediate nodes traversed by the two ring spans 26 may implement a conventional linear traffic forwarding scheme in the same manner as for conventional point-to-point paths. It is not necessary for any of these intermediate nodes to be aware of the sub-ring 22 per se. As a result, while each ring span 26 may traverse multiple physical nodes and links, only the two end nodes 24 are required to implement special traffic forwarding and channel blocking functionality, so that the sub-ring 22 can be logically represented as a two-node sub-network, as illustrated in FIG. 3, independently of the number of intermediate nodes traversed by each ring span.

The sub-ring network 22 can be implemented in any packet network capable of supporting traffic forwarding through two or more predefined routes. Networks having a physical mesh or ring topology may be used. Examples of known packet networks in which the present invention may be used include Internet Protocol (IP), Ethernet, Multi-Protocol Label Switching (MPLS), Virtual Private LAN Service (VPLS), and Provider Bridging networks. Other types of networks may also be used, without departing from the intended scope of the present invention. In embodiments deployed in an Ethernet network domain, the end nodes 24 may implement traffic forwarding, protection switching and channel blocking in accordance with ITU-T recommendation G.8032. In such embodiments, one of the ring spans is designated as the ring protection link (RPL), and a channel block 30 is imposed on the RPL by the RPL Owner to guarantee loop-freeness. In the example of FIG. 3, node N2 24b acts as the RPL-Owner, but this choice is arbitrary.

The end-nodes may perform similar or different roles within the network, as desired. For example, FIG. 4a shows an embodiment in which both end nodes are edge servers that provide connectivity services to customer systems (CS) 30 connected to an access network (not shown). Conversely, FIG. 4b shows an embodiment in which one end node 24a is an edge server, and the other end-node 24b is an access gateway to a foreign network domain 32.

FIG. 5a illustrates a representative embodiment in which a sub-ring is set-up to support a logical point-to-point connection between two edge servers 24 designated as a Source Address (SA) and a destination Address (DA). Each ring span 26 traverses a number of physical links 34 and intermediate nodes 36 to ensure topological diversity between the two spans 26. One of the ring spans 26b (shown in dashed lines) is designated as the RPL, and a channel block 20 is imposed on that span 26b to ensure loop-freeness. The other ring span 26a is considered to be the active (or working) span, and is shown in a solid line.

FIG. 5a further illustrates a scenario in which a network failure (shown by the cross) is detected, which affects one of the physical links 34 traversed by the active ring span 26a. Following conventional network failure detection techniques, this failure will be detected by the two intermediate nodes 38 nearest the point of failure. Both of these nodes 38 will use the content of their FDB to send a Failure Indication Message (FIM) to their adjacent nodes on each path affected by the link failure. In the case in the sub-ring 22 of FIG. 5a, this function will result in each node 36 forwarding a FIM, in opposite directions, through the active ring span 26a. Upon receipt of the FIM, each end node 24a,b flushes its forwarding database (FDB), and terminates the FIM. In addition, the RPL-Owner (in this case, node 24b) removes the channel block 20 on the RPL to restore connectivity through the sub-ring 22, and imposes a channel block 20 on the (failed) ring span, as may be seen in FIG. 5b. This effectively enables end-to-end connectivity between the two peer nodes to be reestablished using conventional Ethernet flooding and MAC learning functionality. As a result, traffic flow within the ring 22 is restored almost immediately after the FDB in each end node 24 has been flushed, so that the failure recovery time of the logical p2p connection 28 is dominated by the speed at with the FIMs propagate to each end node 24. Failure recovery times of 50 msec or less can readily be obtained in practical networks.

In conventional ring-type protection switching schemes (such as ITU-T G.8032), each FIM would normally be forwarded through a ring until it is received by a node which has already received the corresponding FIM (from the other direction). In the case of a sub-ring network 22, this operation can be modified to terminate FIMs at the two end nodes 24, because there are no other nodes on the sub-ring 22 that need to react to the FIM.

As mentioned above, an advantage of, ITU-T recommendation G.8032 is that it utilizes conventional Ethernet path labeling and packet forwarding techniques to implement a ring network topology. These same techniques can be used to implement the sub-ring network 22 of FIGS. 3-4. Thus, for example, the sub-ring network 22 may be identified using a given Virtual Local Area Network (VLAN) identifier, or a Bearer VLAN identifier (BVID), and respective forwarding information computed for each node 24, 36 of the sub-ring 22 to provide proper forwarding of packets encapsulated with the VLAN (or BVID) of the sub-ring 22.

As may be appreciated, there may be as many sub-rings 22 as there are VLANs (or BVIDs) available to identify them. Thus, for example, in the embodiment of FIG. 5a, it is possible to implement virtually any desired number of sub-rings 22 to support respective logical p2p connections 28 between the two end nodes 24a,b. Furthermore, each such sub-ring is defined on a per-VLAN (or per-BVID) basis, and so is independent of each of the other sub-rings. This implies that the respective ring spans 26 of any given sub-ring 22 (between nodes 24a,b) may be topologically similar or dissimilar from any other sub-ring instantiated between those same end-nodes, as desired. By suitable selection of the RPL of each sub-ring 22, it is therefore possible to use two or more sub-rings to achieve effective load balancing within the network domain 8.

In some networks, it is common to assign a VLAN ID to identify traffic flows associated with a specific network service instance. For example, traffic flows belonging to a given customer may assigned a specific VLAN ID. Where the service instance requires multiple logical p2p connections 28, sub-rings 22 can be instantiated as required. In some embodiments, each of the sub-rings 22 instantiated for a given network service instance may use the same VLAN ID. For example, in a scenario in which a customer has a head office and multiple branch offices, respective sub-rings 22 may be instantiated to support logical p2p connections 28 between each branch office and the head office, and traffic flows through all of these logical p2p connections encapsulated with a common VLAN ID. If desired, different BVIDs may be assigned to each sub-ring (and/or connections between them) to facilitate network operations, administration and maintenance (OAM), while the use of a common VLAN ID facilitates traffic forwarding and accounting functions related to the involved service instance.

As mentioned above, the sub-ring network 22 can be guaranteed to be loop-free by placing a channel block 20 on a link 34 or span 26 (designated as the RPL) of the sub-ring 22 at one of the end-nodes 24 (designated as the RPL-Owner). Thus, in the embodiments of FIGS. 5a and 5b, a channel block 20 can be placed on a link 34 hosted by end-node 24b, which is designated as the RPL-Owner. The ring span 26 traversed by the blocked link 34 is thus the inactive span. However, this means that packets flooded into the sub-ring 22 from the end node 24a will propagate through both spans 26 all the way to the RPL-Owner 24b. It is only when packets being flooded through the "inactive" span 26b reach the RPL-Owner 24b that the inactive span 26b is actually identified as such and the packets discarded. This can lead to un-necessary packet flooding within the network domain 8, which is undesirable.

A solution to this problem is to designate one span 26b (traversing any number or physical links) of the sub-ring 22 as the Ring Protection Span (RPS), and place channel blocks 20 at both ends of that span, as shown in FIG. 6. In effect, the ring-type traffic forwarding, protection switching, and channel blocking mechanism described above is modified such that both of the end nodes 24a and 24b are designated as RPL-Owners, and impose a channel block 20 on the egress port hosting hosing the RPS. With this arrangement, both end nodes 24a and 24b will respond to a FIM message received through the active span 26a, by removing their respective channel block 20 from the RPS to restore connectivity. This operation can be asynchronous without risk of looping.

A further advantage of the embodiment of FIG. 6 is that MAC learning is not required in order to obtain proper traffic forwarding though the logical point-to-point connection 28. More particularly, in conventional Ethernet packet forwarding techniques, if a node receives a packet having an unknown MAC, the node floods the packet to downstream links, and then uses received reply messages to determine the link to which further packets (having that MAC) should be forwarded. In Ethernet networks implementing the embodiment of FIGS. 4a and 5a-b, the end node SA 24a must use this technique in order to learn which one of the two ring spans 26a, 26b is the active span. In contrast, in the embodiment FIG. 6, the presence of the channel block 20 at both ends of the RPS means that a flooded packet will only be forwarded on the active ring span. However, this is desired traffic forwarding behavior, which is obtained without the need for MAC teaming.

As may be appreciated, the use of multiple logical p2p connections 28 within a network domain 8 implements a peer-to-peer partitioning of the network domain 8. Such a partitioning is particularly suitable for deploying E-Line services, and can be used for ELAN and E-tree services in cases where one node of the E-LAN or E-Tree resides in the network domain 8. In cases where multiple nodes of an E-LAN (or E-Tree) resides in the network domain 8, it may be desirable to implement a hub-and-spoke partition within the network domain 8. This can be accomplished by selecting one end node 24a to act as a hub, and instantiating logical p2p connections 28, as required between the hub and each spoke node 24b within the domain, as may be seen in FIG. 7. In such a case, the hub node preferably acts as an ingress node to the network domain 8, so that all traffic of the E-LAN (or E-Tree) service traverses the hub node. Each logical p2p connection 28 can then be assigned a respective unique VLAN, and traffic flows through each connection 28 encapsulated at the hub node with the appropriate VLAN 10. In some embodiments, the VLAN assigned to each logical p2p connection 28 within a hub-and-spoke partition may identify either one, or both, of the spoke node 24b and the port of the hub node 24a used to host the particular p2p connection 28.

In the foregoing embodiments, only the end nodes 24 of the logical p2p connection 28 have visibility of the ring topology of the sub-ring 22. The intermediate nodes traversed by each ring span 26 implement linear traffic forwarding. However, it will be appreciated that the designation of end nodes and intermediate nodes within a sub-ring 22 are specific to that particular sub-ring. Thus it is possible for a given network node to be traversed by a ring span 26 of a first sub-ring 22, and so be an intermediate node of that sub-ring 22; while simultaneously operating as an end node 24 of a second sub-ring.

The embodiment(s) of the invention described above is (are) intended to be exemplary only. The scope of the invention is therefore intended to be limited solely by the scope of the appended claims.

What is claimed is:

1. A system for controlling packet forwarding through a point-to-point (p2p) connection between first and second end nodes of a packet network domain having a mesh topology, the system comprising:
 a sub-ring network instantiated in the network domain, the sub-ring network comprising a pair of topologically diverse ring spans extending between the first and second end nodes;
 wherein each of the end nodes is controlled to forward packets of the p2p connection through the sub-ring network in accordance with a ring network routing scheme, and an intermediate node traversed by one of the ring spans is controlled to forward packets of the p2p connection through the ring span in accordance with a linear path routing scheme comprising a G.8032 Ethernet ring protocol adapted to operate on the pair of topologically diverse ring spans that do not form a proper G.8032 ring.

2. The system as claimed in claim 1, wherein at least one of the end-nodes is designated as a Ring Protection Link Owner, and is controlled to impose a channel block to prevent forwarding of traffic of the sub-ring network through a selected one of the ring spans.

3. The system as claimed in claim 1, wherein the network domain is any one of an Ethernet domain, an IP domain, a Provider Backbone Transport (PBT) domain, a Multi-Protocol Label Switching (MPLS) domain, and a Virtual Private LAN Service (VPLS) domain.

4. The system as claimed in claim 2, wherein one span of the sub-ring network is designated as a Ring Protection Span, and wherein respective channel blocks are imposed at opposite ends of the Ring Protection Span.

* * * * *